United States Patent [19]

Rhee

[11] Patent Number: 4,551,658

[45] Date of Patent: Nov. 5, 1985

[54] D.C. MOTOR WITH CENTRIFUGAL SEPARATION STARTING BRUSH

[76] Inventor: Byung Y. Rhee, 103-5, 4th Dongsandong, Gurogu, Seoul, Rep. of Korea

[21] Appl. No.: 447,632

[22] Filed: Dec. 7, 1982

[30] Foreign Application Priority Data

Dec. 8, 1981 [KR] Rep. of Korea ............................ 4777

[51] Int. Cl.$^4$ ........................... H02P 1/22; H02P 6/02; H02K 23/24
[52] U.S. Cl. .................................... 318/254; 318/346; 318/519; 310/186
[58] Field of Search .................... 318/138, 254 A, 254, 318/439, 346, 416, 519; 310/46, 68 R, 234, 186

[56] References Cited

U.S. PATENT DOCUMENTS 3,319,104  5/1967  Yasuoka et al. ................. 310/186 X
3,521,100  7/1970  Tamm ................................... 310/186

FOREIGN PATENT DOCUMENTS 54-30411  3/1979  Japan ..................................... 318/254

*Primary Examiner*—William M. Shoop, Jr.
*Assistant Examiner*—Bentsu Ro
*Attorney, Agent, or Firm*—Oblon, Fisher, Spivak, McClelland & Maier

[57] ABSTRACT

A D.C. motor includes a brush and commutator used in starting the motor, but which are not used during the running cycle of the motor. The rotor is formed of a permanent magnet. The stator includes a pair of opposite pole driving coils arranged 180° from each other. A sensing coil is placed halfway between the two driving coils. A starting coil is also included halfway between the driving coils and directly across from the sensing coil. Brushes are mounted on the rotor which contact the stationary commutator when the motor is at rest or just starting. As the motor speeds up, the brushes are centrifugally removed from the commutator, thus breaking the starting circuit.

5 Claims, 2 Drawing Figures

D.C. MOTOR WITH CENTRIFUGAL SEPARATION STARTING BRUSH

BACKGROUND OF THE INVENTION

1. Field of the Invention:

This invention relates generally to a D.C. motor and more particularly to a D.C. motor operating without a brush and commutator, except during start up.

2. Description of the Prior Art:

D.C. motors have commonly used brushes to supply direct current to the coils of the motor. This motor is preferably used since it generally is smaller than an induction motor and yet generates a larger force and uses less current. Unfortunately, the use of brushes causes noise problems and since it is impossible to make the contact between the commutator and the brush perfect, there often appear sparks at the contact point. These sparks cause wear on the brushes and the brushes must hence be replaced.

Due to the mechanical complexity necessary for this type of connection, as well as the fragility of the delicate parts, such a motor experiences many maintenance problems during its operation. Accordingly, it is impossible to expect the motor to run continuously without some repairs. Further, due to the lack of stability of the current supplied through the brushes the rotational speed of the motor varies somewhat. Thus, the motor cannot be used where a precise speed is demanded.

Other motors have been devised which do not use the brush and commutator arrangement, but rather sense the position of the rotor and change the fields on the driving coils in response thereto. The sensor used may be photoelectric or some form of sensing coil, which in any case do not make physical contact with the rotor. While these devices avoid the problem of noise from the brushes they are not completely reliable especially in the starting operation.

SUMMARY OF THE INVENTION

Accordingly, one object of the present invention is to provide a novel D.C. motor with a centrifugal separation starting brush.

Another object of the invention is to provide an improved D.C. motor which uses a brush and commutator in the starting operation but operates as a brushless motor during the normal running operation.

A further object of this invention is to provide an improved D.C. motor having a permanent magnet rotor and driving coils arranged on the stator.

A still further object of this invention is to provide a D.C. motor having driving coils arranged opposite each other on the stator, an induction sensing coil arranged half way between the driving coils and a starting coil arranged directly across from the sensing coil.

A still further object of this invention is to provide a novel D.C. motor which starts easily and which does not produce brush noise during its running operation.

Briefly, these and other objects of the invention are achieved by providing a rotor made of permanent magnet and a stator having driving coils arranged 180° from each other. Two additional coils are arranged half way between the driving coils and opposite each other. One coil is a starting coil while the other coils acts as a sensing coil. The starting coil is connected through a starting circuit which includes a brush and commutator connection in the circuit. Once the rotor moves at normal speed, the brushes break the starting circuit. The sensing circuit is used to trigger a pair of transistors which provide power to the driving coils.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
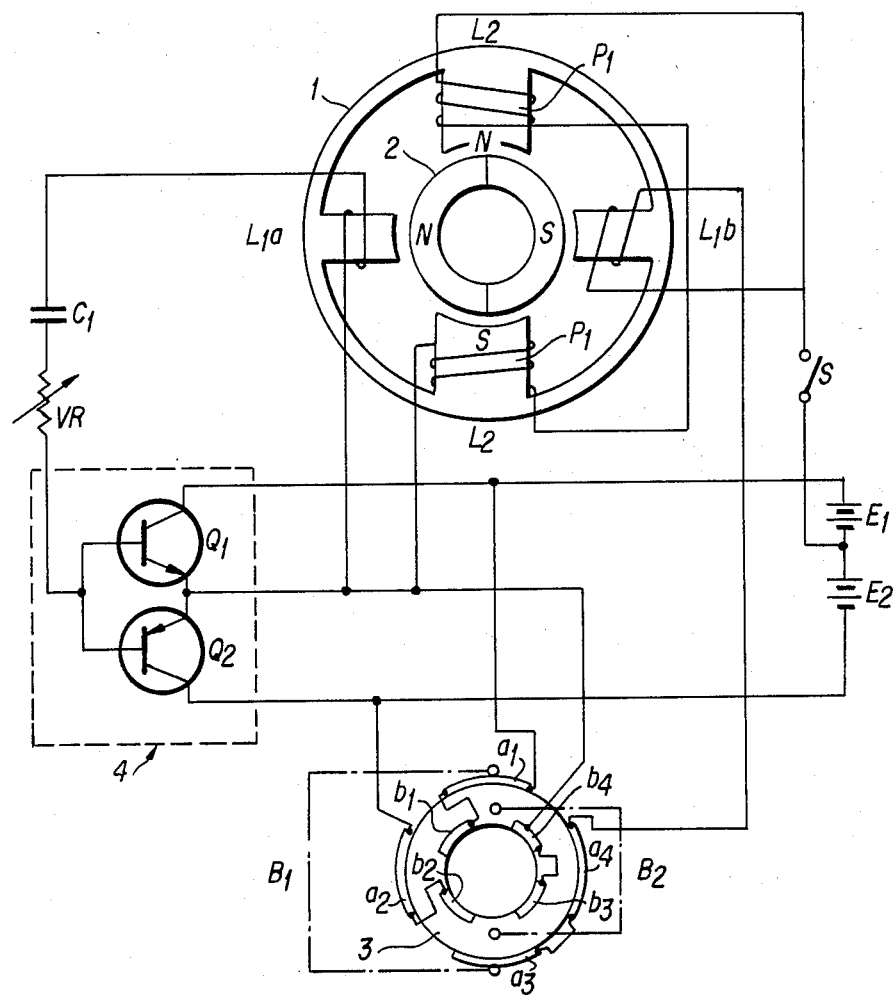
FIG. 1 is a circuit diagram of the present invention.
Figure 2:
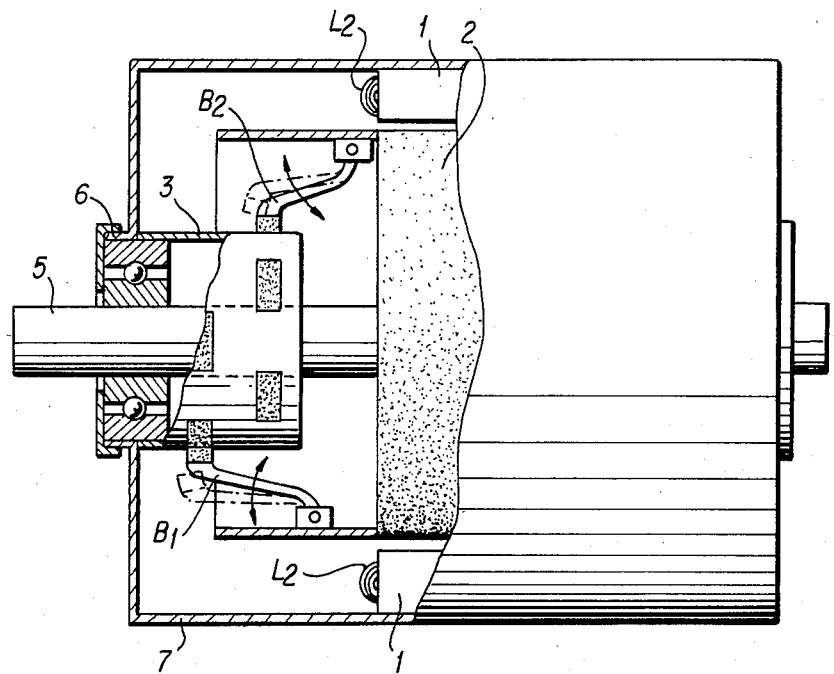
FIG. 2 is a cut-away view of the brush and commutator section of the present invention.

Referring now to the drawings wherein like reference numerals designate identical or corresponding parts throughout the several views and more particularly to FIG. 1 thereof, wherein the electrical circuit of the motor is shown to include a stator (1) having four coils attached thereto. The rotor (2) of the motor is made of a permanent magnet. The stator (1) carries two driving coils $L_2$ with magnetic poles facing in opposite directions from each other. At a position 90 degrees away from each driving coil, the induction sensing coil $L_{1a}$ and the starting coil $L_{1b}$ are wound. The starting coil is connected to a removable electric source supplying means which, for example, consists of centrifugal-separation-type brushes, $B_1$ and $B_2$, and the commutator (3). The commutator (3) is different from standard commutators, as illustrated in FIG. 2, in that it is fixed to the bearing housing (6) around the rotary shaft (5). Two ring contacts are formed on the commutator, with each ring being arranged for contact with one of the two brushes. In FIG. 1, the contacts of the first ring are enumerated $a_{1-4}$, which are contact with brush $B_1$. The second ring contacts are enumerated $b_{1-4}$ and are in contact with brush $B_2$. Each of the two brushes $B_1$ and $B_2$ contact opposite sides of the commutator at the same time. Thus, each brush forms an electrical bridge between contacts in each ring that are 180 degrees apart. As seen in FIG. 1, contacts $a_3$ and $a_4$ are connected together as are contacts $b_3$ and $b_4$. Since the two connected segments in each ring form almost half of the ring, one side of the brush will be in contact with this half at essentially all times. The other two contacts in each ring are connected to the current sources $E_1$ and $E_2$. The brushes $B_1$ and $B_2$ are attached to the rotor (2) and move therewith. As the rotor moves, the brushes come into contact with the contacts in their respective ring. Accordingly, as brush $B_1$ rotates it will form a bridge between either the $a_1$ or $a_2$ contacts and the combination of the $a_3$ and $a_4$ contacts. Since the $a_4$ contact is permanently attached to the starting coil, this means that brush $B_1$ will connect the starting coil to either the $E_1$ or $E_2$ power supply depending on whether contact $a_1$ or $a_2$ is touching the brush $B_1$. Accordingly, brush $B_1$ acts to alternate the polarity of the power supply to the starting coil. Similarly, brush $B_2$ acts as a bridge between the combined contact $b_3$ and $b_4$ with either contact $b_1$ or $b_2$. Since contact $b_4$ is connected to the driving coil, brush $B_2$ will act as a bridge between the driving coil and one of the two current supplies $E_1$ and $E_2$. Thus, in the starting operation, the movement of the brush causes the reversal of current flow in both the starting coil and the driving coils. As the rotor moves faster, centrifugal force on the brushes increases until they are pulled out of contact with the commutator. When this happens, the starting circuit becomes disengaged. Connected to one side of the sensing induction coil $L_{1a}$, is a phase change capacitor $C_1$, a current control variable resistance $V_r$ and the transistor control circuit (4) including symmetrically connected NPN-type transistor $Q_1$ and PNP-type transistor $Q_2$. The mutual output of the two transistors is connected both to the other side of the sensing induction coil and one side of one of the driving coils $L_2$. The other side of this driving coil is commonly connected to the opposite driving coil. The second end of this driving coil is connected to switch S and the common electrode between current sources $E_1$ $E_2$ which are arranged in series. Also connected to the switch is one side of the starting coil $L_{1b}$. The other side of this coil is connected to contact $a_4$ of the commutator. Contacts $a_1$ and $a_2$ of the commutator are connected to current source $E_1$ and $E_2$. At the same time, these sources are connected to one terminal each of the transistors $Q_1$ $Q_2$.

During each rotation of the rotor, the sensing induction coil alternately generates (+) and (−) current by crossing the magnetic field of the rotor. The induction coil is placed 90 degrees from each of the driving coils. Connected to the induction coil is a phase change capacitor which reciprocally causes a charging and discharging current which is synchronized to the rotation of the rotor. This controls the transistor controlling circuit which reciprocally supplies a current to the driving coil. By thus electronically supplying the current to the driving coil of a D.C. motor, it is possible not only to increase the stability of the rotating speed of the motor but also to offer a highly reliable micro D.C. motor applicable to electronic apparatus.

When the rotor starts its rotation under the magnetic force coming from the starting coil, the capacitor shifts the sensed current from the induction coil by 90 degrees and uses the resultant signal as an input to the transistor controlling circuit which controls the supply of driving current to the driving coils. Whenever the magnetic pole of the rotor approaches the magnetic pole of the stator, the (+) and (−) direct current is alternately supplied to the driving coils, the magnetic fields are reversed and the motor may be driven continuously.

The transistor controlling circuit includes two transistors having terminals which are symmetrically connected. When the pole of the rotor crosses the induction coil, the coil generates a current during every 180 degrees rotation. This current is used to charge and discharge the capacitor. The application of this current to the transistor alternately actuates the transistors so that power is supplied to the driving circuits from different current sources during each 180 degrees rotation. Accordingly, the magnetic field in the stator reverses, driving the rotor continuously and stably.

The small motor of the present invention operates as described below.

When the current supply switch S is connected, an electrical circuit including the starting coil $L_{1b}$ is formed. The circuit includes the (+) pole of the electric current source $E_1$, the commutator contact $a_1$, the brush $B_1$, commutator contacts $a_3$ and $a_4$, the starting coil $L_{1b}$, the switch S and the (−) pole of electric current source $E_1$.

Accordingly, the magnetic force of the starting coil $L_{1b}$, causes the rotor (2) made of a permanent magnet to rotate as well as the brushes $B_1$ and $B_2$. When the rotor (2) rotates through a 90 degree angle, the movement of the brushes through the same angle caues a different electrial circut to be formed. Namely, the (+) pole of the electric current source $E_2$, the switch S, the driving coils $L_2$, commutator contact $b_4$, brush $B_2$, commutator contacts $b_2$ and $a_2$ and the (−) pole of the electric current source $E_2$.

Accordingly, the rotor (2) rotates due to the repelling power of the magnetic pole of the driving coil $L_2$ which is of opposite polarity to the poles of the rotor. At this point, there is no difference between the basic driving operation of the present invention and the common D.C. motor. However, in the present invention, during the rotation of the rotor, the centrifugal separation type brushes $B_1$ and $B_2$ are disconnected from the commutator (3) and therefore the electric current supply through the brushes is actually ceased. On the other hand, the rotation of the rotor causes the magnetic field of the rotor which is made of a permanent magnet to cross the induction coil $L_{1a}$ to generate a current. This sensed current is used to control the transistors $Q_1$ and $Q_2$ which change the direction of flow current in the driving coils and hence the direction of the magnetic field at each coil.

At the time when the rotor (2) has rotated 90 degrees from the starting position where the magnetic pole of the rotor (2) faces the opposite magnetic pole of the stator (1), the magnetic pole of the rotor is passing the induction sensing coil $L_{1a}$. At this time, it is possible to obtain the highest velocity of the current from the induction coil, which operates to charge capacitor $C_1$. When the rotor (2) has rotated a second 90 degrees, the charging of the capacitor $C_1$ is completed and no further current is circulated in that direction. When the rotor (2) rotates a third 90 degrees so that the opposite magnetic pole of the rotor now faces the induction coil $L_{1a}$, the value of the induction current is lowered and the capacitor $C_1$ starts to discharge. Thus, the charging and discharging parts of the cycle each operate over a 180 degree section of the rotor's rotation. Each part of the cycle starts when the magnetic pole of the rotor faces one of the driving coils and ends when it faces the opposite coil. By using this cycle to control the transistor control circuit (4) the direction of the magnetic field on the driving coils may be changed in synchronism with the arrival of the magnetic pole of the rotor at the driving coils. Thus, the capacitor $C_1$ causes the transistors to become conductive 90 degrees from the sensing of the magnetic pole of the rotor. Thus, by placing the induction sensing coil $L_{1a}$ 90 degrees from the driving coils, the circuit causes the driving coils to be switched in synchronism with the rotation of the rotor.

Thus, during one-half of the cycle, current supplied to the transistors is (+) current only and the NPN-type transistor $Q_1$ becomes operative so that the current is supplied to the (+) direction of the driving coil $L_2$ through the emitter and collector of the transistor $Q_1$. Since this current is different in direction from the first current source $E_2$ supplied to the driving coil, the magnetic pole of the stator (1) is reversed and the magnetic pole of the rotor which is located opposite the stator is repelled to cause rotation. During the next 180 degree rotation of the rotor (2), the reverse magnetic pole of the rotor (2) crosses the induction coil and the induction coil $L_{1a}$ induces the (−) current in the same way. This current discharges the capacitor $C_1$. The discharged current becomes the input to the transistor control circuit (4). Since the input is (−) current, only the PNP-type transistor $Q_2$ becomes operative and the other transistor $Q_1$ becomes inoperative. By the operation of transistor $Q_2$, current is supplied in a reverse direction from the current source $E_2$ connected in the (−) direction to the driving coils. Thus, the magnetic pole of the stator (1) is reversed again. This action is repeated so that the magnetic field reverses periodically, causing the rotor (2) to rotate continuously.

According to the present invention, after the sensed current is phase shifted by 90 degrees by the capacitor $C_1$, the transistor control circuit is operated and the driving current is supplied to the driving coil $L_2$ so that, when the magnetic pole of the rotor (2) assumes a position 90 degrees from the magnetic pole of the stator (1), the driving current is at a maximum so that the absorption force of the magnetic pole is at a maximum. When the magnetic pole of the rotor and the magnetic pole of the stator are aligned in an opposite direction from each other, the driving current becomes "zero" so that the absorption force is zero. Then, the driving current is reversed and smoothly induces the rotation in a single direction.

The capacitor $C_1$ of the present invention has the function not only to convert the phase of the sensed current but also to promote the rotational activity of the motor. In other words, if the capacitor is adjusted to a different value by using a variable resistance, etc., the amount of current circulated to the induction coil is also increased and the amount of the current supplied to the driving coil is also increased so that the rotational torque of the motor is also increased. However, since the cycle of charging and discharging of the capacitor is extended, the rotational speed of the motor is reduced and the motor has the characteristics of low speed and high torque.

According to the characteristics mentioned above, since the motor is always rotated in a start state, it is possible to be used effectively in any high capacity load and, by adjusting the capacitance of the capacitor, it is possible to freely adjust the rotational torque of the motor. Thus, it is true that a D.C. motor of the present invention has a characteristic feature which has never been obtained in the prior art.

Another function of the capacitor $C_1$ is to broaden the rotational territory of the motor. As illustrated in FIG. 1, since the circuit and the motor is connected to the induction coil through the transistors $Q_1$ and $Q_2$, if there were no capacitor a kind of oscillation circuit would occur. When the maximum part of the magnetic field of the rotor crosses the induction coil $L_{1a}$, the maximum amount of the driving current is supplied to the driving coil $L_2$. Likewise, when the less amount of the magnetic field crosses, a lesser amount of current is supplied to the driving coil. Since this is always the same whether the magnetic field of the rotor is located on the right side or the left side of the center of the induction coil, the rotor can be shaked to the right side or the left side. However, according to the present invention, because the capacitor $C_1$ is combined with the driving coil $L_{1a}$, the phase of the induction current is shifted by 90 degrees and when a greater part of the magnetic field of the rotor crosses the induction coil $L_{1a}$, a lesser amount of the supplied current is circulated to the induction coil $L_{1a}$. When a lesser part of the magnetic field of the rotor crosses the induction coil $L_2$, a greater amount of the current is circulated to the driving coil $L_2$. Wherever the magnetic pole of the rotor is located on the right side or the left side of the center of the induction coil, since the current circulated to the driving coil can be reversed, the magnetic force always acts on one side alone and therefore the rotor can be rotated always in a single direction only without causing any shaking to the right side or the left side. Thus, although the D.C. motor of the present invention is an electronic motor, by changing the resistance of variable resistor Vr, it is possible to rotate effectively at a rotational speed from extremely high speed to an extremely low speed. The lower limit of the rotational speed is that the lower centrifugal force on the start brush allows it to contact the commutator and, in accordance with the design, the lower limit of the rotational speed is variable.

The D.C. motor of the present invention is different from the prior art which used to change the rotational force in accordance with the capacity of the loads and it is possible to offer always a constant rotational speed to any variable load. By combining the input portion of the transistor control circuit with a detection circuit, for example, a constant voltage control circuit consisting of a Zener-diode or any suitable control circuit, the change in the rotational force of the motor is sensed by a change in the sensed current and, by supplying the driving current compensating the rotational force, it is possible to always maintain a fixed rotational speed.

Since the present invention supplies the driving current by an electronic system, there are no sparks or noise produced by the brush means as in the prior art D.C. motor and, since the motor has no movable parts in the driving current supply, there is no fear of mechanical friction or constructional weakness. By stabilizing the supply of the electric current, the rotational force of the motor is stabilized and the motor presents high reliability in the rotational speed so that it is possible to use effectively this motor as a highly elaborate one applicable to electronic apparatus in all kinds of industrial fields.

Obviously, numerous additional modifications and variations of the present invention are possible in light of the above teachings. It is therefore to be understood that within the scope of the claims, the invention may be practiced otherwise than as specifically described herein.

I claim:

1. A D.C. motor comprising:
   a rotor made of a permanent magnet:
   a stator having two driving coils, a starting coil and an induction sensing coil;
   said driving coils being arranged on diametrically opposite sides of the stator;
   said starting coil being arranged at 90 degrees from each of said driving coils;
   said induction sensing coil being arranged at 90 degrees from each of said driving coils and 180 degrees from said starting coil;
   a commutator being fixedly connected to said stator;
   a brush mounted on said rotor and moving in synchronism therewith, said brush being pivotally mounted so as to be in contact with said commutator when moving at slow speeds, but pivoting out of contact with said commutator when moving at higher speeds; and
   wherein said induction sensing coil is connected to a capacitor which received charging the discharging current from said induction coil caused by the rotation of the magnetic field of said rotor through said coil.

2. A D.C. motor as claimed in claim 1, further comprising a transistor control circuit including two symmetrically connected transistors, the gate terminals of said transistors being connected to said capacitor.

3. A D.C. motor as claimed in claim 2, wherein two terminals of said transistors are commonly connected to both said induction sensing coil and said driving coil, and two terminals of said transistors are connected to current supplies.

4. A D.C. motor as claimed in claim 1, wherein said commutator acts during the starting of the motor to supply current of a reversing polarity to the starting coil and the driving coil and which is disconnected when the motor is in a running operation.

5. A D.C. motor as claimed in claim 1, further comprising two serially arranged current sources having a common terminal, and a starting switch connected between said common termainal and both said driving coil and said starting coil.

* * * * *